United States Patent Office 3,173,902
Patented Mar. 16, 1965

3,173,902
TRANSITION METAL CATALYST SYSTEM
Wayne L. Carrick, East Brunswick, N.J., Frederick J. Karol, Wollaston, Mass., and George L. Karapinka, Irvington, N.J., assignors to Union Carbide Corporation, a corporation of New York
No Drawing. Filed Dec. 31, 1959, Ser. No. 479
14 Claims. (Cl. 260—88.2)

The present invention relates to polymerization of olefins. More particularly, this invention relates to a transition metal catalyst system and to the process of using the same for the polymerization of olefins such as ethylene, propylene, butylene and the like alkylene compounds.

The polymerization of olefins in general and ethylene in particular, has within the past decade undergone vast and significant changes and new catalyst systems have been developed permitting the polymerization to be conducted at low pressures and low temperatures. One such system is in the use of organo-aluminum compounds in conjunction with salts of certain transition metals, particularly titanium and vanadium halides. Considerable effort has been devoted to the search for other novel catalyst systems, particularly to avoid some of the difficulties and problems created by the use of aluminum containing catalyst systems. Such systems, while catalyzing the formation of useful olefin polymers of high density, have created a polymer not only high in molecular weight and low in melt index, i.e. that determination of grades of polymer by melt flow techniques, but which also contain a relatively large amount of low molecular weight waxes and oils, and a resulting broad molecular weight distribution. This, unfortunately, adversely affects cracking resistance and low temperature properties of the plastic compositions. In addition, polymers prepared by such systems quite commonly possess melt indices in the range of 0.0 to 0.1 whereas for most commercial applications of extrusion and film-forming applications, melt indices of from 0.2 to 5 are most desired, as the lower melt index resins present problems of extrusion to yield commercially attractive products. Hence modification of such polymers is often necessary to avoid such problems. In order to avoid these difficulties, various catalyst systems have been studied that will yield useful polymers but without this broad molecular weight distribution and without the concomitant production of oils.

One such catalyst system studied, is that prepared by interacting an alkyl aluminum halide and titanium tetrachloride and distilling off the alkyl titanium trichloride thus formed. The catalytic activity of the thus prepared alkyl titanium trihalides alone in the polymerization of olefins, particularly ethylene, was found to vary considerably, ranging from nil to very good, depending, as it turned out, on the amount of residual aluminum compounds in the alkyl titanium trihalide. In all attempts to secure a pure alkyl titanium trihalide by the distillation and even redistillation of alkyl titanium trihalides, it still resulted in from 1 to 7 percent aluminum compounds in the product, even when complexing agents for the aluminum compounds are used, for example, with diphenyl ether. Thus, the aluminum contamination has been found to be the factor imparting the catalytic activity to the alkyl titanium trihalide, the varying effectiveness depending on the amount of aluminum present. A completely aluminum-free alkyl titanium alone, showing a negative aluminum content by the Morin test (sensitivity 1 in 10,000,000 as described by F. Feigl in "Qualitative Analysis by Spot Test," Nordemann Publishing Co., New York, 1939, page 113) yielded no substantial amount of polyethylene in 2 hours at 70° C. when ethylene was employed. Even at 70–100° C. and 0–30 p.s.i. pressure the pure alkyl titanium trihalide could be considered a very poor catalyst. At very drastic conditions about 120° C., the product is only a poor-to-fair catalyst, the polymer secured being a brittle wax rather than a high molecular weight useful polymer.

Thus it appears that pure alkyl titanium trihalides possess, if at all, a catalytic activity of very low order and is, alone, of no significant value. This holds true even when it is employed in combination with crystalline trichloride.

No effective catalyst system to produce useful polymers could be developed from such a mixture. However, a mixture of the alkyl titanium trihalide and only 2 mol percent of triisobutyl aluminum was found to be a good catalyst system for the polymerization of olefins, thus again proving that the effective catalytic activity attributed to the alkyl titanium trihalide alone was in fact due to the presence of residual aluminum compounds present as impurities. Thus a truly aluminum-free effective catalytic system has not yet been secured.

According to the present invention, however, we have now discovered that a novel completely aluminum-free catalyst system based on transition metal compounds alone can be a very efficient catalyst for the polymerization of olefins to produce linear polymers thereof having high molecular weights and initial melt indices within the most commercially desirable range. The catalyst system of the present invention consists of an alkyl titanium trihalide and a halide of vanadium or chromium.

Conversely to the experience above mentioned, wherein titanium halides are not effective in producing an effective catalyst with the alkyl titanium trihalides, the use of a vanadium or chromium halide does in fact produce an effective catalyst with the pure alkyl titanium trihalide. The unique activation or triggering action shown by the vanadium or chromium halides in combination with the alkyl titanium trihalide does not extend to other transition metal compounds, including titanium. The use of such other transition metal compounds with the alkyl titanium trihalide provides, at best, only a low molecular weight brittle wax under drastic and severe conditions and none of the useful high molecular weight linear polyolefins as produced by the present invention. Thus, for practical purposes, they must be considered as inoperative.

While any of the various halides of vanadium or chromium can be employed in this catalyst system, we particularly prefer the halides soluble in the reaction medium if the reaction is to be run in a liquid system, although other insoluble halides of vanadium or chromium can be used if desired. Among some of the more desirable and readily available halides of vanadium and chromium which can be mentioned are vanadium tetra chloride, vanadium tribromide, vanadium trichloride, vanadium oxytrichloride, vanadium pentafluoride, dicyclopentadienyl vanadium dichloride and such similar vanadium compounds including even the divalent vanadium dichloride and vanadium dibromide, the chromium compounds such as chromium trichloride, chromium tribromide, chromyl chloride, chromium oxydichloride, chromium oxydibromide and like compounds.

Thus as can be seen, the terms "halides of vanadium and chromium" as employed herein does not limit the compounds to being composed only of the halogen and metal. It is only necessary that there be halogen bonded to the metal atom and the remaining valences of the metal can be filled with other atoms or radicals, for instance to oxygen or other inorganic atoms, or to organic radicals.

While we prefer to use the chromium or vanadium halides in amounts of between about 0.01 to 1.0 mole per mole of the alkyl titanium trichloride, the amount is not narrowly critical. However, we have found that amounts of less than .01 mole per mole of the alkyl titanium trichloride yield a catalyst so weak in activity that useful rates of reaction are difficult to achieve. While amounts much greater than about one mole of the vanadium or chromium halide per mole of alkyl titanium trichloride can be used if desired, such large amounts create no additional benefits and in fact are somewhat detrimental and lead to a lower catalytic activity.

The alkyl titanium trihalides useful in this invention include the lower alkyl titanium trihalides such as is represented by the formula $RTi(X)_3$ wherein R is a lower alkyl group such as those having from 1 to 6 carbon atoms and X is a halogen. While any such alkyl group and any halogen can be used, we prefer the methyl and ethyl alkyl groups and the chlorine and bromine halogens such as is represented in the following compounds; methyl titanium trichloride, methyl titanium tribromide, ethyl titanium trichloride and ethyl titanium tribromide. These compounds are by far the most common and easiest to prepare free of contaminating aluminum compounds.

Such compounds are readily prepared by the reaction of the titanium tetrahalide wherein the halogens correspond to those desired in the final product, with an alkyl aluminum halide, such as dialkyl aluminum chloride, wherein the alkyl group or groups corresponds to the alkyl group desired in the resulting alkyl titanium trihalide. Admixing at ambient temperatures is generally sufficient to effect the reaction, though if desired, gentle heat may be employed to hasten the reaction. It is possible also to prepare such products from alkyl metal compounds of zinc, lead, magnesium, cadmium and lithium if desired; however the aluminum compounds are very readily available and less expensive.

With alkyl aluminum compounds however, extreme care in distillation of the alkyl titanium trihalides from the mixture should be undertaken if an aluminum free product is obtained, principally because of the volatility of the alkyl aluminum compounds. Desirably, an inert liquid is preferred for the reaction medium, for instance heavy mineral oil, liquid hydrocarbons, or chlorinated aromatic compounds if they are sufficiently non-volatile at the distillation temperature so as to remain behind in the reaction vessel. Simple distillation even with such complexing agents such as diphenyl ether generally results in from 1 to 7 percent aluminum in the product and even redistillation and/or crystallization procedures may not be adequate to completely remove the aluminum impurities. We have found that redistilling the alkyl titanium trihalide in the presence of a small trace of a vanadium halide, such as vanadium tetrachloride, very desirably and effectively permits the alkyl titanium trihalide to be recovered from the redistillate free of aluminum and able to pass the Morin test for aluminum which can detect aluminum in amounts as low as one part in ten million.

While for use in polymerizing olefins, in general, the alkyl titanium trihalide used in this invention does not of necessity, have to be absolutely free of aluminum compounds, we have found it very desirable to do so. The alkyl aluminum compounds present in the alkyl titanium trihalide can form active catalyst sites with the vanadium or chromium halides in addition to the active catalyst site formed by such compounds with the alkyl titanium trihalide. These additional active-catalyst sites compete in the polymerization and cause the molecular weight distribution of the resulting polymer to be broadened. As is well known, a broad distribution of molecular weights in the polymer has a distinct and detrimental effect on certain properties of the polymer, particularly on the extruded film clarity and low temperature properties of the polymer.

Hence by completely removing the aluminum compounds from the alkyl titanium trihalide before use in this process, we are able to avoid such difficulties and produce polymers of very narrow molecular weight distribution and to improve the reproducibility of results and better control the polymerization even using different prepared catalyst components or components from different batches.

Further, during copolymerization, when employing a mixture of differing monomeric olefins, each type of active catalyst site has been found to yield a copolymer containing a characteristic proportion of the several monomers differing from other catalyst sites. Hence, in a system containing several differing catalysts sites, varying copolymers of different compositions and of varying molecular weight distribution will invariably result to the detriment of the polymer for certain end uses. Hence, it is most desirable to remove the aluminum compounds from the catalytic components.

This completely transition metal catalyst system is most desirably employed in the process dispersed in an inert organic liquid, although other equivalent polymerization processes can be employed if desired. An inert organic liquid such as benzene, cyclohexane or other inert hydrocarbon or even halohydrocarbon solvents such as the chlorinated aromatic liquids serve very nicely in the liquid phase process. The use of the liquid medium provides for good dispersion of the catalyst system with the olefin particularly if the olefin gas is bubbled through the liquid dispersion of catalyst.

While the concentration of the catalyst in the liquid is not narrowly critical we preferably employ the catalyst in amounts between about 1 to 20 millimoles total catalyst per liter of inert diluent. However, greater or lesser amounts can of course be used depending on the particular adaptations of the process and the desires of the operator. Amounts of the catalyst of lower than about 0.5 millimole per liter of liquid can be used but tends to result in a decreased reaction rate and consequent yield of polymer; whereas amounts greater than about 100 millimoles of total catalyst per liter of diluent serve no additional benefit.

It is of course possible, if desired in this process, to add one of the catalyst components slowly to the reaction in small increments, or to add it all at once. Similarly, reaction time is not critical, and can be from a few minutes to several hours, depending upon the operational design of the process.

The lower olefins which may be polymerized with this all-transition metal catalyst system include the lowest olefins, ethylene and propylene as well as those having up to about six carbon atoms, such as butene, heptene, hexene and the like. However, little commercial interest presently exists with homopolymers of this latter group although there currently is interest in copolymers of such olefins with ethylene and propylene. Thus while this process and the catalyst system can be employed with these lower olefin monomers and mixtures of such monomers to produce high molecular weight linear homopolymers and high molecular weight copolymers, the most desirable products are the polyethylenes, polypropylenes and the copolymers of ethylene and another olefin, for example the ethylene-propylene and ethylene-butene copolymers, and for that reason are preferred. From our experience, it appears that the catalytic activity of the catalyst decreases with increasing size of the olefin.

Thus by the use of the term "lower olefin polymer" as used herein, we mean to include not only the homopolymers but also the copolymers of such olefins when two or more different monomers are used.

The process of this invention to produce these polymers can be readily conducted over a wide temperature range, generally however, it will be found desirable to conduct it at temperatures between 25° C. and 150° C., but more preferably between about 50° C. and 100° C. Monomer pressure can be any value from subatmospheric to very high, but the range of from 1 to 3 atmospheres is most convenient and there is little or nothing to be gained by higher pressures. Other obvious variations and changes in the process will occur to those skilled in the art, or can be seen from the following examples. As for instance, the olefin monomer can be added below the surface of the inert organic diluent, or can be pressurized into the atmosphere as desired. As with other olefin polymerizations, it is desired that the reaction be conducted in the substantial absence of oxygen and under anhydrous conditions. Likewise it is not necessary that all of the catalyst be added at once, for one or both of the components may be added slowly, either separately or together.

Similarly, this invention is not limited solely to batch operation but is readily adapted to continuous or semi-continuous operation by suitable modifications as will be obvious to those skilled in the art.

The following examples are illustrative of this invention and are not to be construed as limiting the invention as otherwise described.

EXAMPLE I

*Preparation of aluminum-free $CH_3TiCl_3$*

Thirty-three milliliters of titanium tetrachloride were mixed with 150 ml. of heavy mineral oil in a 250 ml. two-neck, round bottom flask through which nitrogen was continuously passing. Trimethyl aluminum (10 ml.) was then added dropwise over a period a 20 minutes. The exotherm caused the temperature to rise from room temperature to 40° C. After the addition of trimethyl aluminum was complete, 19 ml. of liquid diphenyl ether was added. After the mixture was cooled to room temperature, the methyl titanium trichloride was distilled at 2 mm. pressure and 25° C. into a receiver cooled in an acetone-Dry Ice bath. The yield of crude methyl titanium trichloride containing about 0.3 to 1.0 percent of aluminum compounds (calc. as $CH_3AlCl_2$), was 27 g., 53% of the theoretical amount.

For further purification, this methyl titanium trichloride was again distilled after the addition of 0.5 ml. of $VCl_4$ to form the precipitate which will complex with the methyl aluminum dichloride and render it non-volatile. A final distillation (at 2 mm. pressure) gave a product (B.P. 25° C. @ 2 mm.) which showed a negative Morin test for aluminum (sensitivity 1 part in $10^7$).

EXAMPLE II

Fifty millimoles of methyl titanium trichloride were added under nitrogen to one liter of dry heptane at 30° C. in a 3-1, three-neck flask fitted with a mechanical stirrer, thermometer, condenser, and gas inlet tube. The nitrogen flow was discontinued and ethylene was introduced at the rate of 1.5 liters/min. Four millimoles of vanadium tetrachloride was then added. Polymer appeared instantly. The temperature then rose slowly, reaching 80° C. in a period of one hour, then dropping. Gentle heat was applied to keep the temperature at 80° C. After 1.5 hours total reaction time, the slurry was quenched with 750 ml. of isopropanol, the polymer was removed by filtration, washed with isopropanol-hydrogenchloride mixture (about 5 ml. conc. HCl per liter isopropanol) and then with acetone. The yield of dry polymer was 105 grams. This polymer had a melt index of 1.5 and contained 0.09% methyl groups and 0.019% vinyl groups.

EXAMPLE III

In this experiment the procedure and reaction conditions were the same as in Example II. The catalyst consisted of 26 millimoles of methyltitanium trichloride and 5 millimoles of vanadium oxytrichloride. After the two components were mixed, the color changed from orange to green to yellowish-brown followed by vigorous polymerization. The yield of polymer was 40 grams. This product has a melt index of 0.32 and 0.07% methyl groups and 0.023% vinyl groups.

EXAMPLE IV

Copolymerizations of ethylene and propylene were carried out in one liter of cyclohexane in a 0.5-gallon stirred autoclave of the type described by J. D. Sutherland and J. P. McKenzie, Industrial and Engineering Chemistry, 48, 17 (1956). The reactor was pressurized to 30 p.s.i. at 70° C. with a premixed monomer feed having the following analysis (weight percent):

|  | Percent |
|---|---|
| Ethylene | 68.8 |
| Propylene | 27.8 |
| Ethane | 2.86 |
| Methane | 0.38 |

The two catalyst components were injected into the pressurized reactor by hypodermic syringe. In the case of vanadium tetrachloride and the methyl titanium trichloride which are normally liquid they were injected per se or as hydrocarbon solutions; the $CrCl_3$ was injected in the form of a colloidal-like suspension in cyclohexane. The results from several Examples IV to V are summarized in the following tables:

| Example | Ti/V Ratio | $CH_3TiCl_3$ (millimoles) | $VCl_4$ (millimoles) | Reaction Time (minutes) | Copolymer | | |
|---|---|---|---|---|---|---|---|
| | | | | | Yield (Grams) | Propylene content (wt. percent) | Melt Index |
| IV | 12 | 3.3 | 0.28 | 30 | 2.5 | 4.7 | 0.04 |
| V | 26 | 4.4 | 0.17 | 30 | 7.0 | 6.9 | 0.03 |
| VI | 12 | 4.1 | 0.34 | 20 | 13.0 | 9.3 | 0.04 |
| VII | 17 | 8.9 | 0.51 | 15 | 20.1 | 11.7 | 0.02 |
| VIII | 55 | 18.6 | 0.34 | 30 | 21.8 | | |

| Example | Ti/Cr Ratio | $CH_3TiCl_3$ (millimoles) | $CrCl_3$ (millimoles) | Reaction Time (minutes) | Copolymer | |
|---|---|---|---|---|---|---|
| | | | | | Yield (Grams) | Propylene Content (Wt. Percent) |
| IX | 3.5 | 35.4 | 10.0 | 30 | 11.0 | 13.3 |
| X | 12 | 35.4 | 2.86 | 30 | 10.5 | 12.0 |

The use of other chromium compounds, e.g., chromyl chloride ($CrO_2Cl_2$) gives similar results to chromium trichloride.

What is claimed is:

1. A catalyst for polymerizing lower olefins consisting essentially of a lower alkyl titanium trihalide with a halide of a metal selected from the group consisting of vanadium and chromium.

2. A catalyst for polymerizing lower olefins consisting essentially of a lower alkyl titanium trichloride with a chloride of a metal selected from the group consisting of vanadium and chromium present in amounts of from 0.01 to 1.0 mole per mole of said lower alkyl titanium trichloride.

3. A catalyst as described in claim 2 wherein the components are dispersed in an inert organic liquid.

4. A catalyst as described in claim 2 wherein the metal chloride is a chloride of vanadium.

5. A catalyst as described in claim 2 wherein the metal chloride is a chloride of chromium.

6. A catalyst as described in claim 3 which contains between 1 to 20 millimoles of total catalyst per liter of inert organic diluent.

7. A catalyst as described in claim 3 in which the alkyl group of the lower alkyl titanium trichloride contains less than about 3 carbon atoms.

8. A catalyst as described in claim 2 in which the alkyl group of the lower alkyl titanium trichloride contains less than about 3 carbon atoms.

9. A process for the polymerization of lower olefins which comprises contacting a lower olefin monomer having up to 6 carbon atoms with a catalyst consisting essentially of a lower alkyl titanium trihalide with a halide of a metal selected from the group consisting of vanadium and chromium present in amounts of at least 0.01 mole per mole of said alkyl titanium trihalide at a temperature within the range of 25° C. to 150° C. for a time at least sufficient to initiate polymerization of the said olefin monomer.

10. A process as described in claim 9 wherein the catalyst is dispersed in an inert organic liquid.

11. A process for the polymerization of lower olefins which comprises contacting a lower olefin monomer having up to 6 carbon atoms with a catalyst consisting essentially of a lower alkyl titanium trichloride with a chloride of a metal selected from the group consisting of vanadium and chromium present in amounts from 0.01 to 1.0 mole per mole of the alkyl titanium trichloride, at a temperature within the range of 50° C. to 100° C. for a time at least sufficient to initiate the polymerization of the said olefin monomer, and thereafter recovering the formed polymer.

12. A process as described in claim 11 in which the olefin monomer contains ethylene.

13. A process as described in claim 11 wherein the olefin monomer is solely ethylene.

14. The process as described in claim 11 wherein the olefin monomer is a mixture of ethylene and propylene.

References Cited in the file of this patent

UNITED STATES PATENTS

| | | |
|---|---|---|
| 2,879,263 | Anderson et al. | Mar. 24, 1959 |
| 2,886,560 | Weber | May 12, 1959 |
| 2,905,645 | Anderson et al. | Sept. 22, 1959 |
| 2,925,392 | Seelbach et al. | Feb. 16, 1960 |

FOREIGN PATENTS

| | | |
|---|---|---|
| 533,362 | Belgium | May 16, 1955 |
| 218,210 | Australia | Nov. 3, 1958 |

OTHER REFERENCES

Van Heerden: J. Polymer Sci., vol. 34, pp. 46 and 47, January 1959.